US011064149B1

(12) United States Patent
Paun et al.

(10) Patent No.: US 11,064,149 B1
(45) Date of Patent: Jul. 13, 2021

(54) BLENDED INTEGRATION OF QUICK RESPONSE CODES INTO IMAGES AND VIDEO

(71) Applicant: The National Institute for Research and Development for Biological Sciences, Bucharest (RO)

(72) Inventors: Paul Andrei Paun, Bucharest (RO); Radu Alexandru Muntean, Bucharest (RO); Eugen Czeizler, Bucharest (RO)

(73) Assignee: The National Institute for Research and Development for Biological Sciences, Bucharest (RO)

( * ) Notice: Subject to any disclaimer, the term of this patent is extended or adjusted under 35 U.S.C. 154(b) by 0 days.

(21) Appl. No.: 16/797,154

(22) Filed: Feb. 21, 2020

(51) Int. Cl.
*H04N 5/445* (2011.01)
*G06K 19/06* (2006.01)

(52) U.S. Cl.
CPC ....... *H04N 5/445* (2013.01); *G06K 19/06037* (2013.01)

(58) Field of Classification Search
CPC ............... H04N 5/445; H04N 21/8358; H04N 2019/06215–2019; G06K 19/06037; G06K 19/00; G06K 19/06; G06K 19/06009; G06K 19/06075; G06K 19/06093; G06K 19/06103; G06K 19/06131; G06K 19/0614; G06K 19/06168; G06K 19/06178; G06K 2019/06215–2019/06281; G06T 1/0021
See application file for complete search history.

(56) References Cited

U.S. PATENT DOCUMENTS

| | | | |
|---|---|---|---|
| 5,726,435 A | 3/1998 | Hara et al. | |
| 8,813,154 B1 * | 8/2014 | Sivertsen | H04N 21/44222 725/113 |
| 9,928,632 B1 * | 3/2018 | Barnum | G06T 11/001 |
| 10,460,141 B2 | 10/2019 | Sharma et al. | |

(Continued)

OTHER PUBLICATIONS

H. Chu, C. Chang, R. Lee, N. Mitra, "Halftone QR Codes", Nov. 2013, 8 pages, ACM Transactions on Graphics, vol. 32, No. 6, Article 217.

(Continued)

*Primary Examiner* — John W Miller
*Assistant Examiner* — Humam M Satti
(74) *Attorney, Agent, or Firm* — Ansari Katiraei LLP; Arman Katiraei; Sadiq Ansari

(57) ABSTRACT

Provided are systems and methods for integrating encoded identifiers (e.g., Quick Response ("QR") codes) with changing arrangements into different video frames of a video in a manner that blends the encoded identifiers with the pixels, coloring, and/or pattern of the video frames and that allows a particular message to be decoded from each encoded identifier. The blended integration of encoded identifiers may include clustering a first set of images from a video based on an amount of variation in the first set of images, determining visual properties for pixels at a particular location within the first set of images, generating an identifier as a two-dimensional pattern with different colored blocks that encode a particular message using coloring that is derived from the visual properties for the pixels at the particular location, and integrating the identifier into the first set of images at the particular location.

18 Claims, 10 Drawing Sheets

(56) References Cited

U.S. PATENT DOCUMENTS

| | | | | |
|---|---|---|---|---|
| 2010/0020970 | A1* | 1/2010 | Liu | H03M 13/1515 380/255 |
| 2015/0086067 | A1* | 3/2015 | Mehta | G06T 1/0071 382/100 |
| 2017/0194035 | A1* | 7/2017 | Mahrt | G11B 27/36 |
| 2019/0259124 | A1* | 8/2019 | Barnett | H04N 19/467 |
| 2019/0295208 | A1* | 9/2019 | Hoarty | G09G 5/393 |
| 2020/0293733 | A1* | 9/2020 | Hassan | G06K 7/1417 |

OTHER PUBLICATIONS

R. Cox, "QArt Codes", Apr. 12, 2012, 8 pages, https://research.swtch.com/qart.

A. Edelman, "The complete pivoting conjecture for Gaussian elimination is false", Mar. 27, 1992, 11 Pages, Lawrence Berkeley Laboratory & Department of Mathematics, University of California Berkeley, California.

Z. Gao, G. Zhai, C. Hu, "The Invisible QR Code", Oct. 2015, 5 pages, Institute of Image Communication and Information Processing Shanghai Jiao Tong University Shanghai, China.

G. Garateguy, G. Arce, D. Lau, O. Villarreal, "QR Images: Optimized Image Embedding in QR Codes", Jul. 2014, 12 Pages, IEEE Transactions on Image Processing.

S. Lin, M. Hu, C. Lee, T, Lee, "Efficient QR Code Beautification With High Quality Visual Content," Sep. 2015, 10 Pages, IEEE Transactions on Multimedia, vol. 17, No. 9, pp. 1515-1524.

S. Ramya, C. S. Joice, "An Optimized Image and Data Embedding in Color QR Code", 2015, 7 Pages, Middle-East Journal of Scientific Research 23 (Sensing, Signal Processing and Security): 66-72, ISSN 1990-9233.

M. Xu, Q. Li, J. Niu, X. Liu, W. Xu, P. Lu, B. Zhou, "Art-up: A Novel Method for Generating Scanning-Robust Aesthetic QR Codes", Aug. 2015, 14 Pages, Journal of Latex Class Files, vol. 14, No. 8.

Y. Lin, Y. Chang, J. Wu, "Appearance-Based QR Code Beautifier", Dec. 2013, 10 Pages, IEEE Transactions on Multimedia, vol. 15, No. 8.

S. Lin, M. Hu, C. Lee, T. Lee, "Efficient QR Code Beautification With High Quality Visual Content", Sep. 2015, 10 pages, IEEE Transactions on Multimedia, vol. 17, No. 9.

T. Wakahara, N. Yamamoto, H. Ochi, "Image Processing of Dotted Picture in the QR Code of Cellular Phone", 2010, 5 Pages, 2010 International Conference on P2P, Parallel, Grid, Cloud and Internet Computing, IEEE DOI 10.1109/3PGC1C.2010.77 pp. 454-458.

T. Wakahara, N. Yamamoto, "Image Processing of 2-Dimensional Barcode", 2011, 7 Pages, 22011 International Conference on Network-Based Information Systems, IEEE DOI 10.1109/NBiS.2011.80 pp. 484-490.

X. Wang, S. Lei, "Image saliency prediction by learning deep probability model", Aug. 2, 2019, 6 Pages, Signal Processing: Image Communication, vol. 78, pp. 471-476.

* cited by examiner

US 11,064,149 B1

BLENDED INTEGRATION OF QUICK RESPONSE CODES INTO IMAGES AND VIDEO

BACKGROUND

Quick Response ("QR") codes are two-dimensional barcodes that encode a machine-readable message via a pattern of blocks or pixels. The QR code may be read and decoded using a sensor of an electronic device (e.g., camera of a smartphone).

QR codes may be used to transmit a bill, invoice, or payment information to the reading device or from the reading device to another device. QR codes may be encoded with product information or data about an object or event. QR codes may also be encoded with a link (e.g., a Uniform Resource Locator ("URL")) that the reading device may access via a wireless network. The link may provide more data than can be encoded in the QR code message, for example, through redirection via link shorteners (e.g., tinyURL.com).

A QR code may be readily identified against a background image due to its block pattern and/or coloring (e.g., black and white). In some instances, the contrast between the QR code and the background image can be disruptive and may draw attention away from the background image. This is especially true when placing a static QR code within a video or set of changing images.

DETAILED DESCRIPTION OF PREFERRED EMBODIMENTS

Figure 1:
FIG. 1 illustrates an example image and an example customized Quick Response ("QR") code that is programmatically generated to be standard-compliant and to encode a particular message while blending with the pixels of the image in accordance with some embodiments presented herein.
Figure 1:
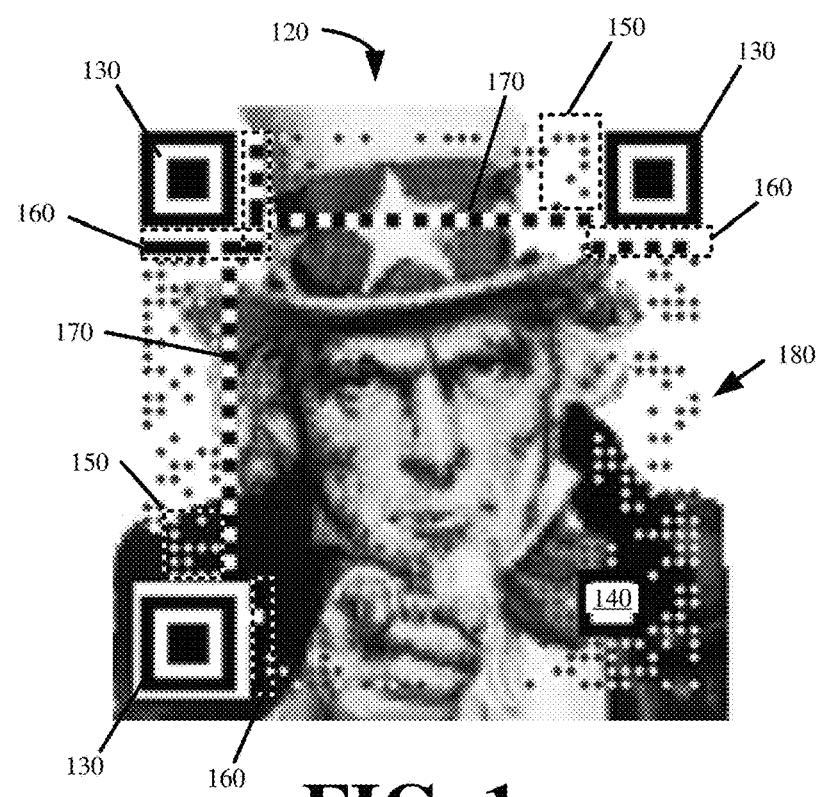

The following detailed description refers to the accompanying drawings. The same reference numbers in different drawings may identify the same or similar elements.

Disclosed are systems and methods for integrating encoded identifiers, such as Quick Response ("QR") codes, with changing arrangements into a plurality of video frames of a video in a manner that blends the encoded identifiers with the pixels, coloring, and/or pattern of the plurality of video frames and that allows the same user-defined or custom message of varying length to be decoded from each encoded identifier during playback of the video. In some embodiments, the encoded identifiers may be highly scannable QR codes that maintain the visual characteristics of each image or frame of video and that may be embedded in real-time into the images or video. Each encoded identifier that is embedded into a region of a video frame may provide a smooth visual transition from where the video frame remains intact (e.g., unmodified) to where the encoded identifier is embedded within that video frame.

Accordingly, in some embodiments, the systems and methods may provide an identifier generation and integration device. The device may produce a QR code or another identifier with an encoded message, and may customize the visual appearance of the QR code or identifier to have similar visual features as a set of pixels of an image or video frame that is embedded with that QR code or identifier. Customizing the visual features of the QR code may include padding the QR code, after the encoded message, information, and/or data of the QR code, with a set of bits, and/or performing a targeted replacement of specific bits so that the QR code may display with a particular visual arrangement with the desired visual features without altering the message that is decoded from that QR code. Specifically, the set of bits may programmatically set or align different portions of the QR code to more closely match the pattern, pixel arrangement, and/or coloring within the section of the image or video frame where the QR code is to be integrated. The customized QR code set forth herein complies with decoding QR code standards. However, the customized QR code may differ from a standard definition of a QR code by having a non-random distribution for some percentage of the pixels that form the QR code, and/or may be defined using a fixed mask that may differ from masks specified by the QR code standard.

The identifier generation and integration device of some embodiments may produce a customized QR code that is dynamic in shape and/or appearance. In particular, the device may transform a customized QR code, that is generated and integrated into one or more initial frames of video, by changing one or more of the padding bits, error bits, and/or mask of the customized QR code in a controlled and/or programmatic manner. In so doing, the device may alter features, patterns, coloring, and/or other visual properties of the customized QR code to change with the visual properties of the video without changing the encoded message of the dynamically changing customized QR code. In other words, the visual appearance of the QR code changes to blend and coincide with changes in the different frames of the video, but the same encoded message (e.g., string, value, Uniform Resource Locator ("URL"), and/or data) may be provided upon scanning, reading, and/or decoding any of the dynamic QR codes from any of the video frames during playback of the video. In some embodiments, the device may also reposition the dynamic QR code to different locations within different video frames where there is visual uniformity and where integration of the dynamic QR code creates the least visual disruption in response to the changing images, coloring, luminosity, and/or other visual properties of the video.

FIG. 1 illustrates example image 110 and example customized QR code 120 that is programmatically generated to be standard-compliant and to encode a particular message while blending with the pixels of image 110 in accordance with some embodiments presented herein. Image 110 may have different coloring, luminosity, shapes, and/or other visual properties at different regions. Customized QR code 120 may preserve many of the visual properties (e.g., coloring, luminosity, shapes, patterns, etc.) of image 110, and specifically the face illustrated in image 110, while still integrating the elements of a highly-scannable QR code or encoded identifier that encodes the particular message. For instance, customized QR code 120 may include positional identifiers 130-1, 130-2, and 130-3 (sometimes collectively referred to as "positional identifiers 130" or individually as "positional identifier 130"), alignment identifier 140, version data 150, format data 160, and timing data 170, and encoded data with error correction 180.

Positional identifiers 130 and/or alignment identifier 140 may include specific blocks within customized QR code 120 that a reader (e.g., a device with a camera or scanner) uses to identify and align encoded data 180. Alignment identifier 140 and/or timing data 170 may assist the reader in focusing on and acquiring encoded data 180, and may allow the reader to correct for skew, alignment, orientation, and/or other distortions that could affect the reading of encoded data 180.

A spacing gap may separate positional identifiers 130 from version data 150, format data 160, and/or other components of customized QR code 120. Version data 150 may specify the encoding of customized QR code 120, and/or the number of blocks or cells contained in customized QR code 120. Format data 160 may contain information about the error tolerance and the data mask pattern used to encode encoded data 180.

Encoded data 180 may store an encoded message, and may include error correction keys to reproduce the message if parts of customized QR code 120 are unreadable and/or are misread. As will be described with reference to FIG. 7 below, encoded data 180 may include a first set of bits for specifying the particular message as well as a second set of padding bits and a third set of error correction bits. In some embodiments, the device repurposes the second set of padding bits and the third set of error correction bits to control various visual properties of customized QR code 120, and thereby produce customized QR code 120 with a semi-nonrandom distribution.

The identifier generation and integration device of some embodiments may manipulate one or more of the bits defining customized QR code 120, the mask pattern, the function defining customized QR code 120, and other parameters in order to control the placement and/or presentation of encoded data 180 within customized QR code 120 and/or to control the placement and/or presentation of other blocks or cells that are used to blend customized QR code 120 with visual properties of an image or video frame that is embedded with customized QR code 120. As shown in FIG. 1, the elements of customized QR code 120 are integrated into image 110 in a manner that minimally distorts or interferes with image 110. In this example, the center of image 110 (e.g., shape, coloring, luminosity, pattern, etc.) is mostly preserved in customized QR code 120 as that region of image 110 contains the most variation and image detail, and as that region may serve as the primary point of focus. The outer edges of image 110 are mostly uniform and are not the primary point of focus. Accordingly, the blocks and/or cells that define encoded data 180 and that cause the greatest distortion within customized QR code 120 may be set about the outer edges of customized QR code 120 by the identifier generation and integration device of some embodiments.

Rather than integrate the customized QR code or the encoded identifier into the entirety of an image or video frame, some embodiments integrate the customized QR code or the encoded identifier into a portion of the image or video frame. In so doing, integration of the customized QR code or the encoded identifier does not impact the primary point of focus and/or a majority of the image or video frame. Instead, the impact of integrating the customized QR code is minimized by isolating the distortion to a portion of the image or video frame that does not divert from the focus of the image or video frame.

For instance, during playback of a video, the customized QR code may be blended into the bottom left corner of the video with a customized pattern, coloring, and/or other visual properties that are similar to, align with, match, and/or correspond to visual properties at the bottom left corner of the video. The blended integration of the customized QR code in the bottom left corner or in an isolated region of the video allows the customized QR code to be scanned at any point throughout playback of the video without distracting from or distorting the center or primary point of focus of the video, and with only minimal distortion to the bottom left corner of the video.

To further minimize the impact, some embodiments may use a priority function to vary the arrangement of the customized QR code so as to minimize the impact to the integrated region of the image or video frame (e.g., create the least distortion and/or cause the least amount of distraction from the primary point of focus or center of the image). The priority function may also provide dynamic placement of the customized QR code by selecting different locations in different frames of the video at which to integrate the customized QR code and/or different arrangements for the customized QR code at those locations, rather than statically locate the customized QR code in the same location with the same arrangement for every frame of the video.

Figure 2:
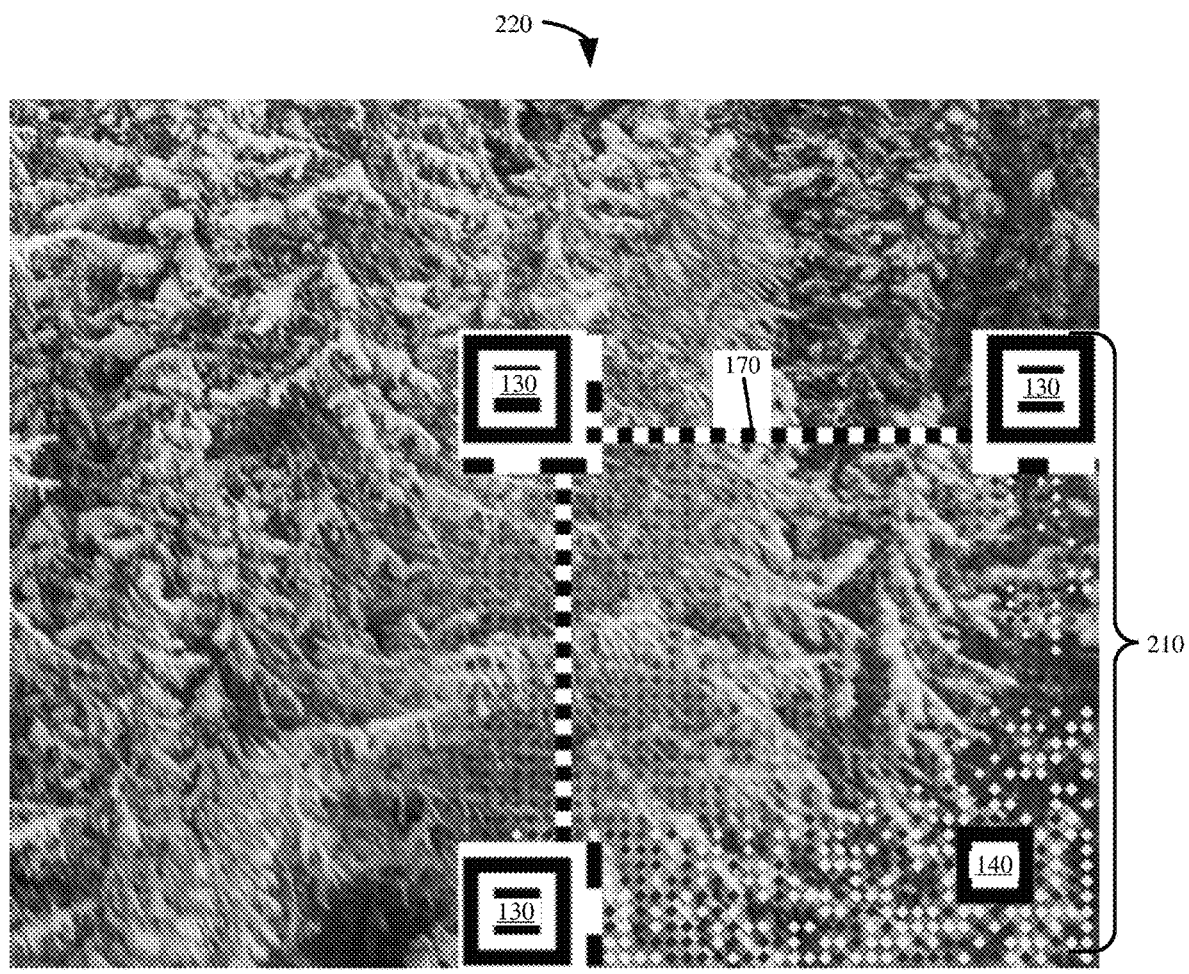
FIG. 2 illustrates an example of integrating a customized QR code into a portion of a video frame in accordance with some embodiments presented herein.

FIG. 2 illustrates an example of integrating customized QR code 210 into a portion of video frame 220 in accordance with some embodiments presented herein. As shown in FIG. 2, customized QR code 210 may be integrated into the bottom right corner of video frame 220. FIG. 2 may present a portion of video frame 220, rather than the entirety of video frame 220, so that the integration of customized QR code 210 and the impact of the integration can be more clearly illustrated. In other words, FIG. 2 may provide a zoomed-in view of video frame 220, whereas the actual presentation of video frame 220 may include additional portions of video frame 220 with customized QR code 210 occupying a smaller percentage of the entirety of video frame 220 than what is shown in FIG. 2.

The region of video frame 220 above and to the left of customized QR code 210 is unmodified (e.g., not altered or distorted by the integration of customized QR code 210). The region of video frame 220 where customized QR code 210 is embedded is modified. In particular, customized QR code 210 may include a specific arrangement of cells and/or blocks that encode the message of customized QR code 210 and that are overlaid atop or onto the pixels of video frame 220 where customized QR code 210 is integrated. The cells and/or blocks of customized QR code 210 may have slightly different coloring than the coloring of the original pixels of video frame 220 in order to improve readability of customized QR code 210 and/or differentiate the different bits that define customized QR code 210. However, the coloring for the pixels and/or blocks of customized QR code 210 (e.g., encoded data 180 of customized QR code 210) may be selected to resemble or best match the coloring of the original pixels while still remaining machine-readable. Due to the pattern, blocks, coloring, and/or other visual properties of customized QR code 210, the human eye may perceive video frame 220 to be slightly pixelated or distorted in the region where customized QR code 210 is integrated, although the overall impression of video frame 220 may remain intact, and the primary point of focus of video frame 220 may be unaffected.

In some embodiments, positional identifiers 130, alignment identifier 140, and/or timing data 170 of customized QR code 210 remain as black and white blocks. Once again, the disturbance created by these color-mismatched components of customized QR code 210 may be minimized by isolating customized QR code 210 to a corner of video frame 220, and/or by decreasing the overall percentage of video frame 220 that is occupied by customized QR code 210. In some other embodiments, positional identifiers 130, alignment identifier 140, and/or timing data 170 of customized QR code 210 may be colored to match the coloring of the underlying portion of video frame 220.

The position of customized QR code 210 within video frame 220 may be selected when rendering the video, when generating and/or integrating customized QR code 210 into video frame 220, or when playing back the video. The position may be selected to minimize the disturbance to the overall video.

For instance, the bottom right corner of video frame 220 may be selected based on a uniformity of color in that region. A uniformly colored region may be ideal for integration of customized QR code 210 because encoded data 180 for customized QR code 210 can be presented using two different colors, and the two different colors may be selected based on their similarity to the colors in that uniform region of video frame 220, thereby leading to less distortion of the uniformly colored region. For instance, if the region of video frame 220 selected for integration of customized QR code 210 has red, green, and blue ("RGB") color values ranging from (120, 100, 200) to (130, 118, 230), then customized QR code 210 may be formed by a pattern of a first set of pixels with RGB values of (120, 100, 200) and a second set of pixels with RGB values of (130, 118, 230). In some embodiments, a first set of colors may be used to present the first set of pixels, and a second set of colors may be used to present the second set of pixels, provided that the first set of colors are different than the second set of pixels, and provided that customized QR code 210 can be encoded with the first set of colors representing a first bit and the second set of colors representing a second bit of the encoded data.

Some embodiments reposition and modify the appearance of the customized QR code or the encoded identifier that is blended into a video without modifying the encoded message of the customized QR code or the encoded identifier as the images or frames of the video change. These dynamic modifications to the customized QR code or the encoded identifier may adapt the customized QR code or the encoded identifier to the changing video, and ensure that the customized QR code or the encoded identifier continues to blend in the video despite the video frames changing scenes, colors, lighting, etc.

Figure 3:
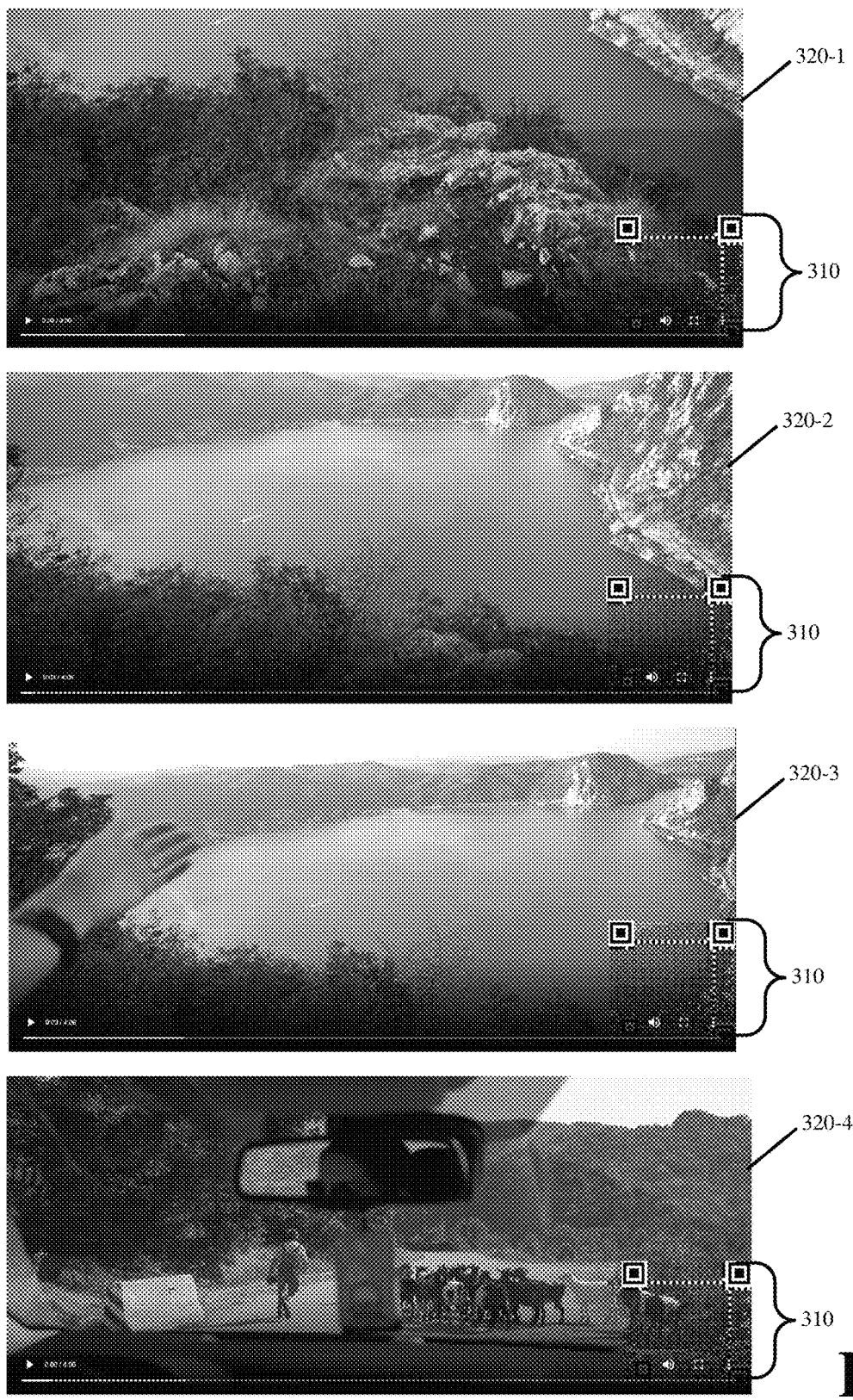
FIG. 3 illustrates an example of a dynamic QR code that is transformed to encode the same message using different patterns or arrangements of cells or blocks that blend more seamlessly with changing images of a video in accordance with some embodiments presented herein.

FIG. 3 illustrates an example of dynamic QR code 310 that is transformed to encode the same message using different patterns or arrangements of cells or blocks that blend more seamlessly with changing images of a video in accordance with some embodiments presented herein. FIG. 3 illustrates four frames 320-1, 320-2, 320-3, and 320-4 (sometimes collectively referred to as "frames 320" or individually as "frame 320") at different times during playback of the same video.

Integrated in the bottom right corner of each frame 320 is a different transformation of dynamic QR code 310. Each transformation may provide a different arrangement for the cells or blocks that form dynamic QR code 310. Each arrangement or transformation of dynamic QR code 310 may be defined to encode the same particular message in a manner that minimizes the distortion or change to the underlying portion of the respective frame 320 in which dynamic QR code 310 is embedded.

For instance, the arrangement of different colored blocks (e.g., white, black, and/or other colored blocks) of dynamic QR code 310 integrated in frame 320-1 is different than the arrangement of different colored blocks of dynamic QR code 310 integrated in frames 320-2, 320-3, and 320-4; the arrangement of different colored blocks of dynamic QR code 310 integrated in frame 320-2 is different than the arrangement of different colored blocks of dynamic QR code 310 integrated in frames 320-1, 320-3, and 320-4; the arrangement of different colored blocks of dynamic QR code 310 integrated in frame 320-3 is different than the arrangement of different colored blocks of dynamic QR code 310 integrated in frames 320-1, 320-2, and 320-4; and the arrangement of different colored blocks of dynamic QR code 310 integrated in frame 320-4 is different than the arrangement of different colored blocks of dynamic QR code 310 integrated in frames 320-1, 320-2, and 320-3. However, in each case, the arrangement of different colored blocks can be read by a QR code reader, and will decode to output the same message, data, string, and/or value.

The identifier generation and integration device, that creates and/or transforms dynamic QR code 310 for each frame 320, may control and/or set the arrangement for each instance of dynamic QR code 310. In particular, each instance of dynamic QR code 310 may be arranged or set to ensure that dynamic QR code 310 encodes the same user-defined message across different frames of the same video, that dynamic QR code 310 blends with the area of the image of the respective frame 320 into which dynamic QR code 310 is integrated, and that dynamic QR code 310 is highly scannable despite removing bits or blocks of data and/or error correction code from the top left and center areas of dynamic QR code 310 in order to minimize distortion in those areas.

The identifier generation and integration device may customize the message of dynamic QR code 310 (e.g., different message of different lengths) for different videos and/or for different sets of frames within the same video, and may modify the appearance of that dynamic QR code 310 to blend in with each image from each frame of video. Similarly, the identifier generation and integration device may encode two or more messages of the same or different lengths in a single dynamic QR code 310, and may modify the appearance of that dynamic QR code 310 to blend in with each image from each frame of video while ensure that each of the two or more messages is readable and can be decoded with a reader.

Figure 4:
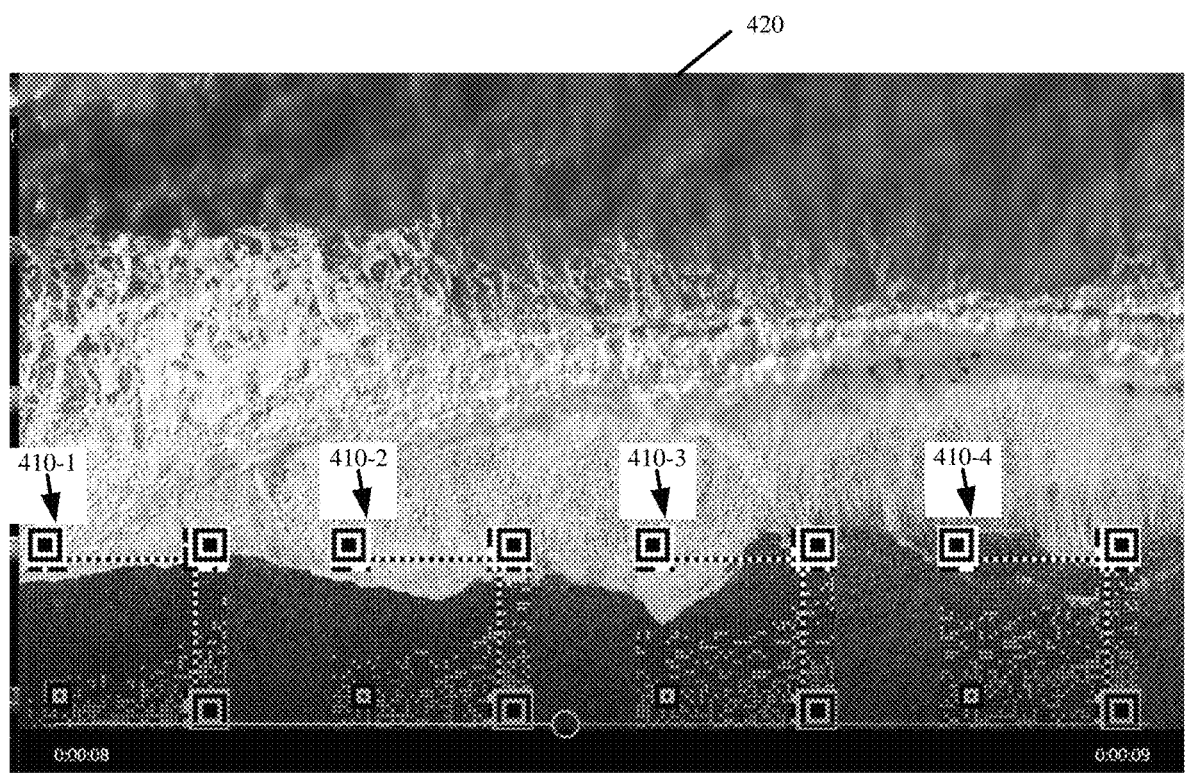
FIG. 4 illustrates an example of different instances or transformations for blending a dynamic QR code at different locations in an image or a video frame in accordance with some embodiments presented herein.

FIG. 4 illustrates an example of different instances or transformations for blending a dynamic QR code at different locations in an image or a video frame in accordance with some embodiments presented herein. For instance, FIG. 4 illustrates four different instances or transformations of dynamic QR code 410-1, 410-2, 410-3, and 410-4 (sometimes collectively referred to as "dynamic QR code instances 410" or individually as "dynamic QR code instance 410") at different locations in the same image or video frame 420.

Each dynamic QR code instance 410 may have different visual properties (e.g., different coloring, different arrangement of cells or blocks, different number of cells or blocks, etc.) to conform to and blend with the visual properties for the portion of the video frame 420 over which that dynamic QR code instance 410 is placed. In some embodiments, each dynamic QR code instance 410 may encode the same message, string, link, value, and/or data despite the differences in visual properties. In some other embodiments, each dynamic QR code instance 410 may encode a different message or a different length message.

The identifier generation and integration device may determine which placement and which dynamic QR code instance 410, that is generated for that placement, results in the least impact to video frame 420. For instance, the device may determine that dynamic QR code instance 410-1 in the lower left corner has fewer blocks or cells, blends more seamlessly, and produces less distortion than the other placements for dynamic QR code instances 410-2, 410-3, and 410-4. The device may integrate instance 410-1 in the lower left corner because of these and other criteria.

Consequently, the placement of dynamic QR code 410 may improve the visual quality by having a different intensity when coloring the cells of dynamic QR code 410 (e.g., provide a more uniform zone in the frame based on the coloring of the pixels, or provide a more stable zone in the video among consecutive frames), and/or by better matching to one or several masks that can increase the number of controlled bits.

In some embodiments, the device may move the dynamic QR code to different locations in different video frames of the same video based on the same or similar criteria. The device may move the dynamic QR code to different locations in the same video to minimize distortion when the underlying images of the video change.

Figure 5:
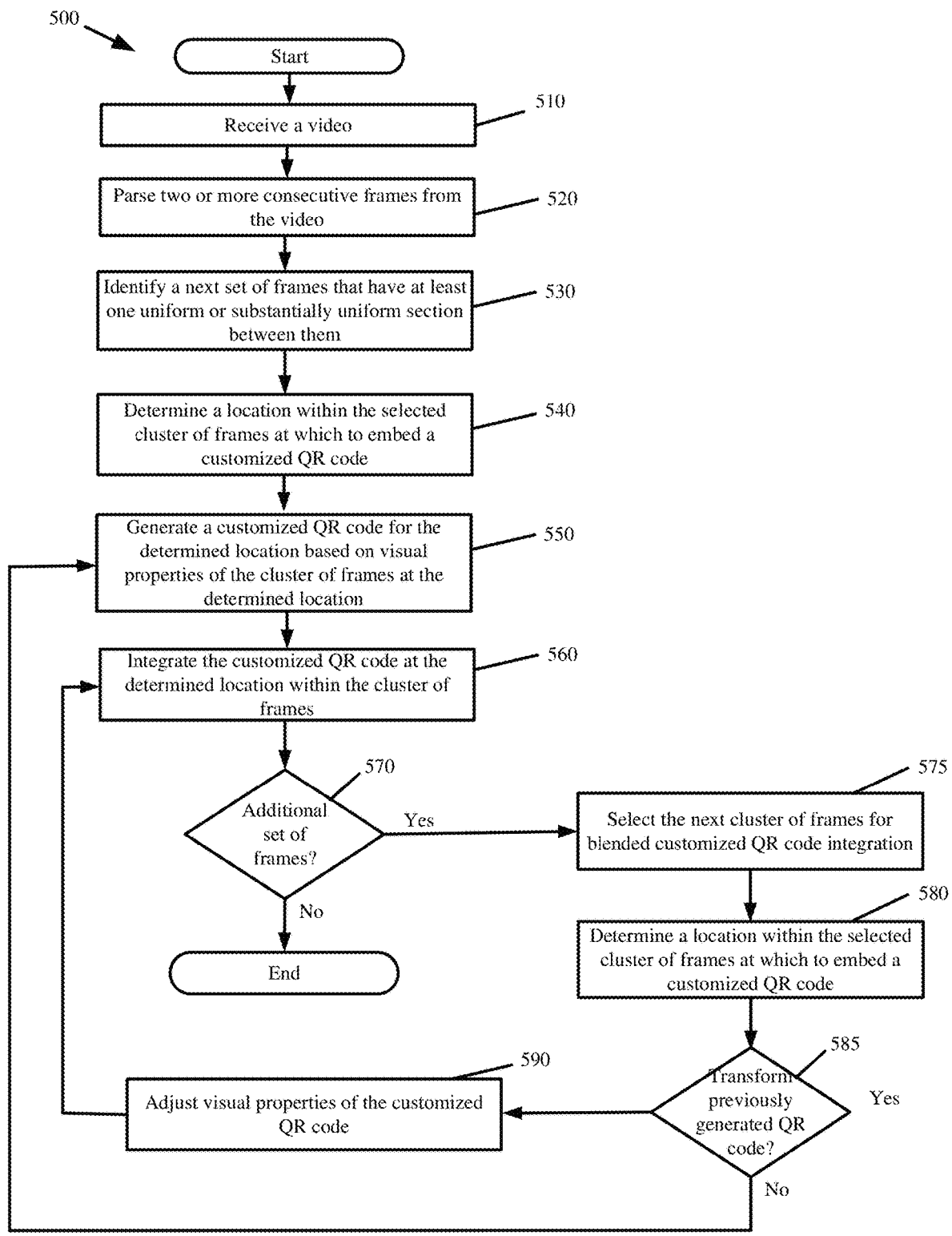
FIG. 5 presents a process for integrating a customized QR code within an image or a video frame in accordance with some embodiments presented herein.

FIG. 5 presents a process 500 for integrating a customized QR code within an image or a video frame in accordance with some embodiments presented herein. Process 500 may be implemented by the identifier generation and integration device of some embodiments.

Process 500 may include receiving (at 510) a video. Process 500 may receive (at 510) a video file that encodes the images as an intermixed set of "I", "P", "B", and other frame types. The I frame may correspond to a keyframe that can be rendered using only the information in the I frame without referencing any information from other frames in the video file. This contrasts with P frames or B frames that reference information from frames before or after, and are therefore incomplete by themselves. Encoders intermix I, P, B, and other frame types to reduce file size, thereby allowing the video to be transferred with less data than if every frame was a keyframe or I frame. Process 500 may also receive (at 510) the video as a stream from an encoder, server, or other device. The stream may include one or more manifests, that identify a playback sequence for the stream segments that encode the video, and the stream segments. Each segment may encode a different part of the video via a different set of frames. In some embodiments, process 500 may receive (at 510) the video as an analog feed.

Process 500 may include parsing (at 520) two or more consecutive frames from the video to identify (at 530) a next cluster or set of frames that have at least one uniform or substantially uniform section between them. The set of frames may render a common scene in which there is a threshold amount of common lighting, objects, coloring, and/or pixels between the set of frames. Such commonality may be present amongst several frames because a second of video may involve 24 or 30 frames, and there may be little deviation between each of those frames over one or more seconds of video playback.

In some embodiments, the identification (at 530) of the frame cluster (e.g., the set of frames for a common cluster) may be based on the video encoding. Specifically, the identification (at 530) of the frame cluster may be based on the amount of information in the I, P, or B frames that encode the video or the presence of these different frame types in the video encoding. For instance, each cluster may start upon detecting a next keyframe or I frame in the video encoding.

In some embodiments, the identification (at 530) of the frame cluster may be based on image analysis or visual processing of the video. In some such embodiments, the identifier generation and integration device may render the video, and may identify (at 530) a new frame cluster upon detecting a threshold amount of deviation between the rendered images.

Process 500 may include determining (at 540) a rotation and/or a location within the selected cluster of frames at which to embed a customized QR code. The location for the customized QR code may be based on user criteria, image criteria, or a combination of both. In some embodiments, the location for the customized QR code may, additionally or alternatively, account for the possible rotation of the customized QR code and/or the effect that the rotation has on the aforementioned criteria.

The user criteria may specify placement of the customized QR code at a particular region or area of each video frame that is chosen by a user. The user may choose the particular region based on preference, knowledge of the video, knowledge of viewer behavior, and/or other reasons. The user may also choose the particular region to fix the location of the customized QR code within the video, thereby providing viewers with a static location at which to read or scan the customized QR code. The user criteria may further specify a rotation for the customized QR code.

The image criteria may specify thresholds for certain coloring, luminosity, patterns, uniformity, positions, and/or other elements within the images or video frames of the cluster that can serve as locations for the customized QR code. For instance, the image criteria may prioritize a location within the cluster of frames where there is the most uniformity and least deviation such that the presence of the customized QR code at that location does not draw focus away from changing scenes in the frames, and the customized QR code can remain unchanged for each of the frames in the cluster while still blending in with each frame at the location where there is uniformity.

In some embodiments, determining (at 540) the rotation and/or the location for the customized QR code based on the image criteria may include analyzing the selected cluster of frames to identify a location and/or rotation within the cluster of frames that best matches the image criteria. The analysis may include scoring different sections of the video frames (e.g., top left corner, top right corner, right side, middle, left side, bottom left corner, and bottom right corner) based on visual properties of the pixels in those sections and the image criteria, and selecting the location and/or the rotation for the customized QR code based on the resulting scoring.

Process 500 may include generating (at 550) a customized QR code with the determined rotation and/or for the determined location of the video frames. Generating (at 550) the customized QR code may involve generating a QR code that encodes a particular message, and then customizing the QR code by rotating the QR code and/or manipulating the bits of the QR code based on the visual properties of the cluster of frames at the determined location. More specifically, customizing the QR code may include arranging blocks or cells of the customized QR code to match an arrangement of pixels in the images, coloring the blocks or cells to match coloring of the pixels in the image, and/or moving the blocks or cells to leave important areas in the images untouched and to distort unimportant areas in the images with unmovable message data, wherein the important areas may correspond to parts of the images in which there is a large amount of deviation or change, or areas of user focus. Generation (at 550) of the customized QR code may further include adaptively changing the mask or mask pattern used to define the QR code pattern, adding supplementary random blocks or padding bits, rotating the customized QR code, and/or adaptively setting a function that defines the priority beautification zone for the customized QR code at the determined location.

Process 500 may include integrating (at 560) the customized QR code at the determined location within the cluster of frames. The integration (at 560) of the customized QR code may involve modifying the image data for the cluster of frames to include the customized QR code. In this case, the customized QR code becomes part of the video, and is presented when rendering or playing back the video. In some embodiments, modifying the image data may include reencoding the video to embed the customized QR code as part of the different frames. Alternatively, the integration (at 560) may involve overlaying the customized QR code atop the video at the determined location during playback or rendering of the video. In this case, the customized QR code may remain separate from the video, and may be merged with the video presentation during playback or rendering of the video.

Process 500 may include determining (at 570) if the video includes additional frame clusters or set of frames that have not been integrated with the customized QR code and/or for which customized QR code is desired. In response to determining (at 570—No) that there are no remaining frame clusters or set of frames in the video, process 500 may end. In response to determining (at 570—Yes) that there is a frame cluster or set of frames that have not been integrated with the customized QR code, process 500 may include selecting (at 575) the next cluster of frames for blended customized QR code integration. Selecting (at 575) the next cluster of frames may include parsing two or more consecutive frames of the video, and identifying at least one uniform or substantially uniform section between them.

Process 500 may include determining (at 580) a rotation and/or a location within the selected cluster of frames at which to embed a customized QR code, and determining (at 585) if the customized QR code for the previous cluster of frames can be transformed to blend at the determined location of the newly selected cluster of frames. The determination (at 585) for transforming the customized QR code may be based on the variation between the visual properties at the determined location of the current cluster of frames and visual properties at the determined location of the previous cluster of frames. For instance, if the difference between the two clusters results from movement within a common scene, then the previous customized QR code may be transformed. However, if the difference between the two clusters results from an entirely new scene or image, then process 500 may generate an entirely new customized QR code. Furthermore, the identifier generation and integration device may buffer the last set of generated customized QR codes (e.g., the last 20 generated customized QR codes), and may check whether any of buffered customized QR codes is potentially suited to be transformed and/or integrated in the current frame or cluster of frames.

Accordingly, in response to determining (at 585—Yes) that the customized QR code can be transformed to match visual properties at the determined location of the selected cluster of frames, process 500 may include adjusting (at 590) one or more visual properties of the customized QR code to align with the visual properties of the images at the determined location. In some embodiments, adjusting (at 590) the visual properties may include changing any of the coloring or arrangement of blocks that form the customized QR code by modifying the padding and/or error correcting bits, changing the applied mask and/or rotation, or modifying parameters of the function used to specify the arrangement or order of customized QR code blocks. Process 500 may include integrating (at 560) the customized QR code at the determined location within the selected cluster of frames.

In response to determining (at 585—No) that the previously generated or buffered customized QR code cannot be transformed to match visual properties at the determined location of the selected cluster of frames, process 500 may include generating (at 560) an entirely new customized QR code based on the visual properties at the determined location of the selected cluster of frames, and integrating (at 570) the generated customized QR code at the determined location. In some embodiments, it is more efficient to generate the customized QR code anew rather than transforming a previous customized QR code when the difference between the visual properties at the determined location of the selected cluster of frames and the determined location for the previous cluster of frames exceeds a threshold, when the pixel pattern or images are different, and/or when the determined location for the two clusters differs by more than a specified threshold.

Figure 6:
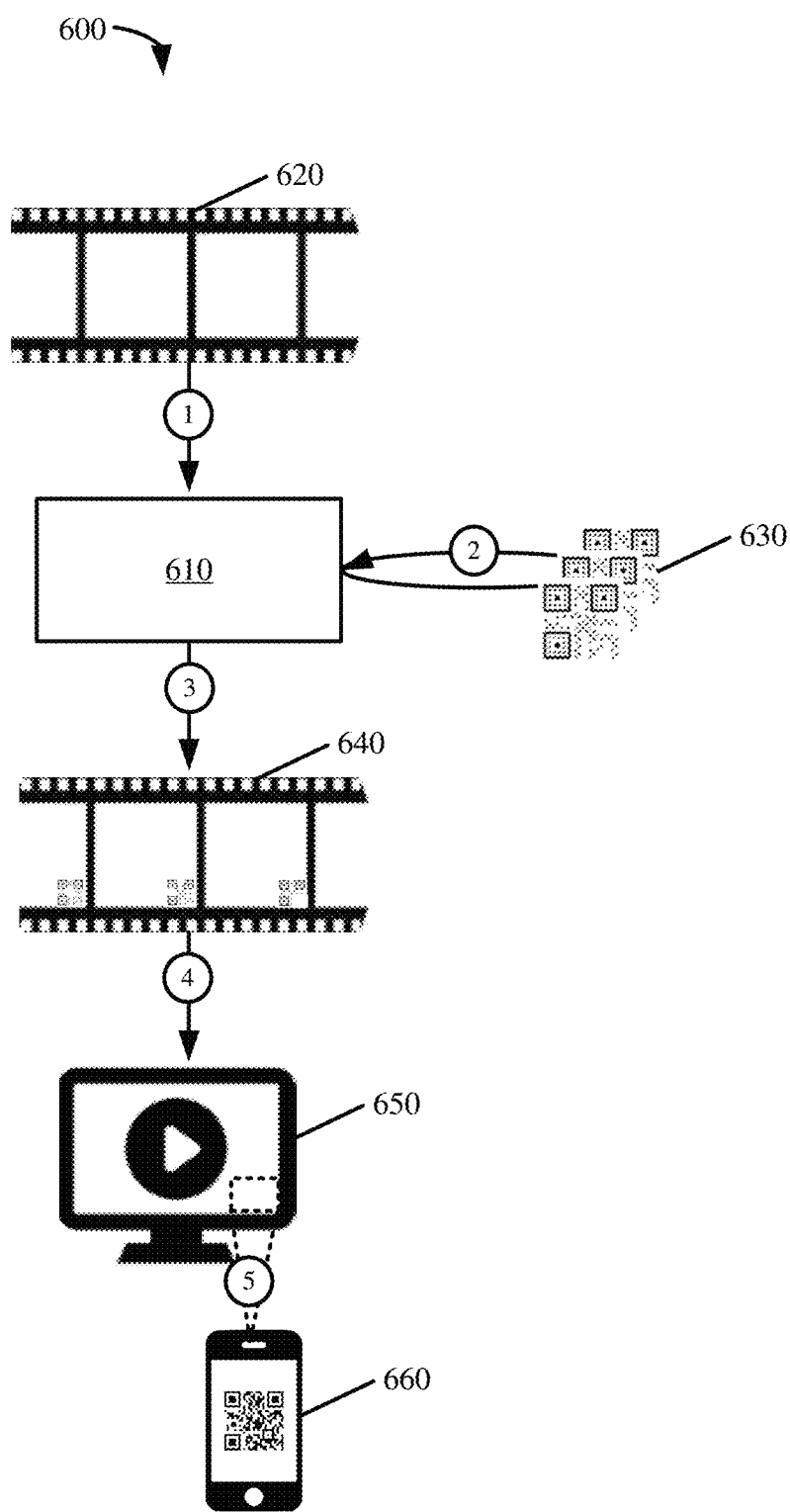
FIG. 6 presents an example environment for generating the customized QR codes and blending the customized QR codes into one or more images or video frames in accordance with some embodiments presented herein.

FIG. 6 presents an example environment 600 for generating the customized QR codes and blending the customized QR codes into one or more images or video frames in accordance with some embodiments presented herein. Environment 600 may include identifier generation and integration device 610, original video 620, set of customized QR codes 630, video with integrated QR codes 640, playback device 650, and/or reader 660.

Device 610 may be a standalone device or hosted service that can be accessed via a network. Device 610 may receive (at 1) original video 620 as input. Original video 620 may correspond to a video file, video stream, analog feed, and/or other form of video distribution. In some embodiments, device 610 may receive (at 1) at least two inputs: a first image or first video frame from original video 620 that is the target of the customized QR code integration, and a string. The string may represent the message that is to be encoded in the customized QR code.

Device 610 may generate (at 2) the set of customized QR codes 630 based on the visual properties of original video 620 and/or based on process 500, and may integrate (at 3) the set of customized QR codes 630 in different video frames and/or different locations in those video frames. Accordingly, output from device 610 may include a second image or second video frame that matches or is similar to the first image or video frame from original video 620 by some threshold, that is integrated with a customized QR code, that is scannable with any standard-compliant QR code reader or scanner, and that outputs the encoded message (e.g., the input string) when read using the standard-compliant QR code reader or scanner.

The outputs of device 610 may result in the creation of modified video 640. Modified video 640 may include images or video frames of original video 620 that have been integrated with different customized QR codes, wherein the different customized QR codes may encode the same particular message using different two-dimensional patterns or arrangements of blocks. In particular, modified video 640 may provide each image or video frame of original video 620 with a set of blocks from a customized QR code placed over a region of the image or video frame.

Device 610 may provide (at 4) modified video with integrated QR codes 640 to one or more playback devices 650. Modified video with integrated QR codes 640 may be distributed over a network or on a physical medium (e.g., Blu-ray disc).

Playback devices 650 may include software and hardware devices that are capable of rendering and playing back modified video with integrated QR codes 640 and/or other media. Playback device 650 may include a set-top box, television, smartphone, gaming system, computer, tablet, projection device, and/or other media playback equipment. In some embodiments, device 610 may be part of playback device 650, and providing (at 4) modified video with integrated QR codes 640 may include presenting the video with the different customized QR codes or other encoded identifiers integrated at the same or different locations within different images or video frames of the video.

Reader 660 may include a device with a sensor that is capable of scanning and/or decoding (at 5) the set of customized QR codes 630 and/or other encoded identifiers during playback of modified video with integrated QR codes 640. The sensor can include one or more cameras, a scanner, and/or imaging equipment that captures any of the set of customized QR codes 630 when presented on a screen or display. Reader 660 may also include one or more processors to decode the same message, string, link, value, and/or other data from each of the set of customized QR codes 630. Reader 660 may include a smartphone, computer, tablet, smart-watch, wearable device, and/or device with a sensor for reading and decoding QR codes and/or other encoded identifiers.

The quantity of components and/or devices, illustrated in FIG. 6, is provided for explanatory purposes only. In practice, environment 600 may include additional components, devices and/or networks; fewer components, devices, and/or networks; different components, devices and/or networks; or differently arranged components, devices, and/or networks than illustrated in FIG. 6. Alternatively, or additionally, one or more of the devices of environment 600 may perform one or more functions described as being performed by another device of environment 600. Additionally, the devices of environment 600 may interconnect with each other, and/or other devices, via wired connections, wireless connections, or a combination of wired and wireless connections. In some embodiments, one or more devices of environment 600 may be physically integrated in, and/or may be physically attached to, one or more other devices of environment 600 or other devices that operate in a network or at video provider site. Also, while direct connections are shown in FIG. 6 between certain devices, some devices may communicate with each other via one or more additional devices and/or networks.

In order to obtain control over the formatting and/or definition for a portion of the customized QR code, device 610 may generate the customized QR code using QR code version 6 and/or L error correction level. QR code version 6 is the largest QR code version that contains one alignment identifier 140. The position of alignment identifier 140 and/or other alignment identifiers for larger QR code versions may be fixed. Accordingly, each additional alignment identifier that is required introduces another QR code element that cannot be moved by device 610 and/or that could further distort the image that is to be integrated with the customized QR code. Error correction level L may reduce the number of bits that are allocated for redundancy and/or error correction purposes. The bits that would be used for higher level error correction can be repurposed as padding bits for customizing the visual properties (e.g., setting the structure, arrangement, pattern, coloring, etc.) of the customized QR code. In some other embodiments, device 610 may generate the customized QR code using a different QR code version, error correction level, or combination thereof.

QR code version 6 can be used to encode up to 154 alphanumeric characters. In some embodiments, the customized QR code is defined to use 10-15 of the alphanumeric characters to encode the message of the customized QR code, and to use or repurpose the remaining alphanumeric characters as padding bits for customizing the visual properties of the customized QR code. For instance, bits and/or alphanumeric characters can be used to pad the message so as to customize the positioning for the version, make, message, and/or other data of the customized QR code. In particular, by padding the customized QR code, device 610 may shift the blocks (e.g., the arrangement of cells) of the customized QR code to one side, thereby creating minimal distortion towards the center/priority zone (according to a predefined priority function) of the customized QR code and underlying image falling in that region of the customized QR code. As noted above, by using error correction level L, device 610 may also repurpose one or more alphanumeric characters or bits from being used as error correcting code to being used to define visual properties that better match the visual properties of the underlying image over which the customized QR code is integrated.

As a specific example for setting the visual properties of the customized QR code, some embodiments may use 11 bits for encoding 2 alphanumeric characters of the customized QR code message, instead of 8 bits for encoding a single alphanumeric character. Consequently, the encoded message may be specified using a smaller subset of alphanumeric characters (e.g., uppercase letters, digits, spaces, and any of the "$%*+−./:" symbols) than would be available when using the full 8 bits for each alphanumeric character. The smaller subset of alphanumeric characters is however sufficient to encode strings, data, values, URLs, and/or other messages of the customized QR code. Moreover, URL translation from abbreviated or tiny URLs to full length URLs can be used to provide access to alphanumeric characters that may otherwise be restricted based on 11-bit encoding scheme. The remaining bits (e.g., bits not used for the 11-bit encoding of the message) can be used as padding for setting the structure, pattern, coloring, and/or other visual properties of the customized QR code.

Figure 7:
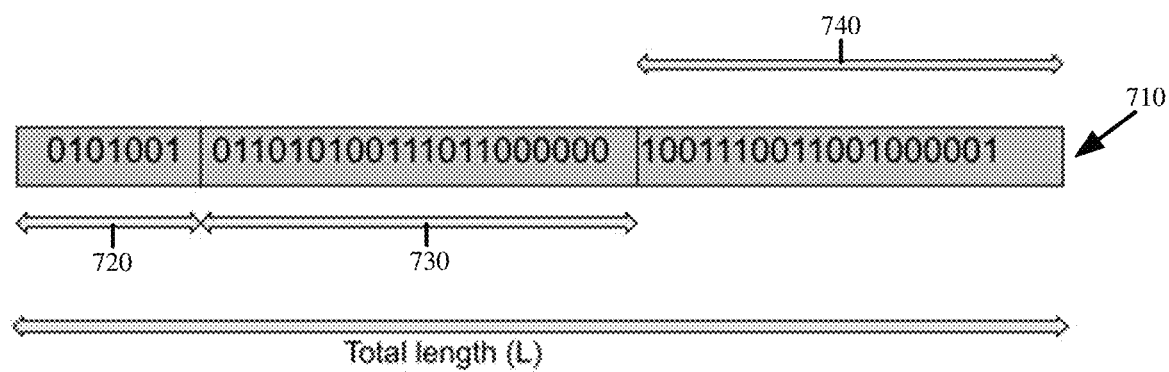
FIG. 7 conceptually illustrates an example of repurposing bits of the customized QR code to control visual properties of that customized QR code in accordance with some embodiments presented herein.

FIG. 7 conceptually illustrates an example of repurposing bits of the customized QR code to control visual properties of that customized QR code in accordance with some embodiments presented herein. In particular, FIG. 7 illustrates the padding bits or zone of the customized QR code that can be repurposed to control the visual properties of that customized QR code.

FIG. 7 illustrates an example linearized representation for block 710 of a customized QR code. In some embodiments, block 710 may represent a rectangular, square, or other subsection of the customized QR code. In some other embodiments, block 710 may represent the entirety of the customized QR code.

A cell with a first color (e.g., a white cell) in block 710 may be represented by a value of 0. A cell with a different second color (e.g., a black cell) in block 710 may be represented by a value of 1. Block 710 may have a length of ILI.

As shown in FIG. 7, block 710 may include data zone 720, padding zone 730, and/or error zone 740. Data zone 720 may include the bits and/or data for the encoded message (e.g., string, data, value, link, etc.) of the customized QR code, may include the length of the encoded message (useful for finding the border between data zone and padding zone), and/or may include a mode indicator (e.g., alphanumeric, ascii, numeric) (useful for finding the value of X in an X-bit encoding). Accordingly, the bits for data zone 720 may be fixed and set according to the message being encoded. Padding zone 730 may include the bits and/or data that could be used for a longer encoded string, and that can be used to control or set various visual properties for block 710. For instance, in some embodiments, padding zone 730 may be used to shift cells of the customized QR code to specific areas, to set colors for cells defined within padding zone 730, to control cells in error zone 740, etc. Error zone 740 may include the bits and/or data for correcting errors in block 710 or elsewhere in the customized QR code that prevent reading and/or decoding of data zone 720 or the message encoded in data zone 720. Error zone 740 may be derived directly from data zone 720 and padding zone 730. The checksum for block 710 may correspond to or may be derived from the length ILI, wherein length ILI may correspond to the length of each of data zone 720, padding zone 730, and/or error zone 740.

Since error zone 740 is derived from data zone 720 and padding zone 730, it is possible to control the definition of error zone 740. The embodiments set forth herein leverage control of error zone 740 to reduce the distortion within error zone 740 of the customized QR code, and to further reduce the overall impact of integrating the customized QR code within an underlying image. More specifically, some embodiments manipulate bits in one or more of padding zone 730 and error zone 740 to create the customized QR code with a desired arrangement of cells, that resemble pixels of an underlying image, with no inherent errors.

Control over error zone 740 may be based on the observation that an XOR operation applied to two QR code blocks, that encode first and second messages, results in a QR code block that encodes the XOR between the two messages (e.g., a message that results from the XOR operation of the first and second messages). Based on the QR code block resulting from the XOR operation, device 610 may determine various bits from error zone 740 that can be used, in addition to bits of padding zone 730, to define visual properties of the customized QR code. Moving control of the visual properties beyond padding zone 730 into error zone 740 provides more flexibility in terms of controlling the visual properties of the customized QR code, thereby leading to a better visualization (e.g., a customized QR code with visual properties that better match the visual properties of the underlying image onto which the customized QR code is placed).

A Gauss normalization example is now provided to demonstrate how device 610 may obtain control over different bits within error zone 740. The Gauss normalization example is illustrated with reference to example QR code block 1011.0000000.01101. Data zone 720 is represented in the example QR code block by the first four bits, padding zone 730 is represented in the example QR code block by the middle seven bits, and error zone 740 is represented in the example QR code block by the last five bits.

The example continues by demonstrating how control over the middle bit in the five bits of error zone 740 may be obtained. To establish control over error zone 740, some embodiments may generate one or more blocks that have 0 for data zone 720 and a different bit (and/or a random set of bits) in padding zone set to 1. For instance, the generated blocks for obtaining control over error zone 740 of example block 1011.0000000.01101 may include:

0000.1000000.10101 (1)
0000.0100000.00011 (2)
0000.0010000.11011 (3)
0000.0001000.01101 (4)
0000.0000100.10110 (5)
0000.0000010.00111 (6)
0000.0000001.01001 (7)

For explanatory purposes, error zone 740 for each of the generated blocks is randomly set. The generated blocks may correspond to void string defined blocks that are neutral when used as part of an XOR operation. More specifically, the XOR operation applied to a void string defined block may determine which bits within error zone 740 can be used to control the visual properties.

In order to change the middle bit in error zone 740 from a value of 1 to a value of 0, device 610 may select a generated block in which the desired bit is set to 0. Accordingly, device 610 may select the first generated block (1). Device 610 may also XOR all other generated blocks (e.g., generated blocks (4), (5), and (6) to produce modified blocks:

0000.1000000.10101 (1)
0000.0100000.00011 (2)
0000.0010000.11011 (3)
0000.1001000.11000 (4')
0000.1000100.00011 (5')
0000.1000010.10010 (6')
0000.0000001.01001 (7)

The resulting blocks confirm that the first generated block (1) is the only block with the desired bit set to 1. Device 610 may XOR example block 1011.0000000.01101 with the first generated block (1) to generate modified example block 1011.1000000.11000. The modified example block retains the same bits in data zone 720 as the original example block, and has a modified error zone 740 in which the desired middle bit in error zone 740 is changed to a custom value. Device 610 may remove or delete the first generated block (1) to prevent further changes to the middle bit in error zone 740.

The example may continue by determining that the third bit in padding zone 730 of modified example block 1011.1000000.11000 should be a 0 value. Since the value is already set to 0, device 610 may ensure that the value remains 0 by identifying the third generated block (3) as the only remaining available block that has the third bit in padding zone 730 set to 0. Accordingly, no XOR operations are necessary, and device 610 may remove the third generated block (3) from the list of available blocks. Device 610 can continue in this manner to set or change any bit in padding zone 730 and/or error zone 740 of the example block without changing the message that is encoded within data zone 720. More specifically, device 610 may target and replace specific bits within the error correcting code of an encoded identifier (e.g., a customized QR code) with specific values using one or more XOR operations. The same operations can be performed to set bits in padding zone 730, however device 610 may have full control of these bits when initially defining the example block.

The Gauss normalization can be used to generate a customized QR code or to transform an existing customized QR code. Transformation of an existing customized QR code may be completed faster than generating a new customized QR code as the transformation involves fewer XOR operations. Specifically, the previously generated customized QR code may include several QR code cells that require no change to match the visual properties that have changed from a prior image to a current image. Accordingly, the customized QR code transformation may include performing the Gauss normalization against a subset of cells within the existing customized QR code that require change to a few cells rather than to all cells of existing customized QR code.

Some embodiments beautify the customized QR code (e.g., modifying visual properties of the customized QR code to align with visual properties of the pixels onto which the customized QR code is integrated) by setting the number of trigonometrical rotations that are applied to the customized QR code. In some embodiments, device 610 rotates the customized QR code in order to place the data zone 720 (which cannot be customized or controlled in the same manner as padding zone 730 and error zone 740) furthest away from the center of the image onto which the customized QR code is integrated. For instance, device 610 may generate and rotate the customized QR code to place data zone 720 at the bottom when integrating the customized QR code in the bottom corner of one or more images or video frames.

Some embodiments further beautify the customized QR code by improving the number of points in the customized QR code that can be manipulated through the adaptive change of the mask (e.g., finding the best valid mask which improves the visual appearance of the bits in data zone 720), performing halftone coloring on unfixed modules, thresholding the white and/or black limits of the customized QR codes, and/or using a priority function to order the customized QR code blocks.

A halftone coloring on unfixed modules in a 2-color QR code (white and black cells) may identify a set of thresholds, TW and TB, and a function F. The function F may receive a set of pixels in a red, green, blue ("RGB") format (e.g., the set of pixels in the target image behind the zone where the regarding QR block or cell will be placed) as input, and may return a value X corresponding to that set of pixels. If the value of X is less than TB, the QR block or cell may be considered black; if the value of X is larger than TW, the QR block or cell may be considered white; otherwise the initial set of pixels may be manually changed to reach the desired value TW or TB by applying the function F on the modified set of pixels. The function F may be the weighted and/or normalized sum over the independent R, G and B values for all the pixels received.

A priority function may identify a priority for each cell or pixel of the customized QR code, and may set an order between the cells or pixels of the customized QR code. Assuming a QR code has a first cell with coordinates (x1, y1), and a second cell with coordinates (x2, y2), the priority function may determine that the first cell should be prioritized over the second cell in order to achieve a desired arrangement for the visual properties of the customized QR code. The priority function may then configure the Gauss normalization procedure to set the bit corresponding to the first cell before the second cell. More specifically, the priority function may define the order (e.g., ascending order) in which the customized QR code cells are set using the Gauss normalization procedure described above. The value to set for any cell may be calculated according to the target image. Accordingly, the ordering may cause the first cell or other cell with higher priority to be set with a visual property that matches the visual property of one or more pixels of the image at the corresponding location of the high priority cells (e.g., the first cell), whereas the second cell or other lower priority cells may be set based on values in data zone 720 and/or the message that is to be encoded in the customized QR code.

Figure 8:
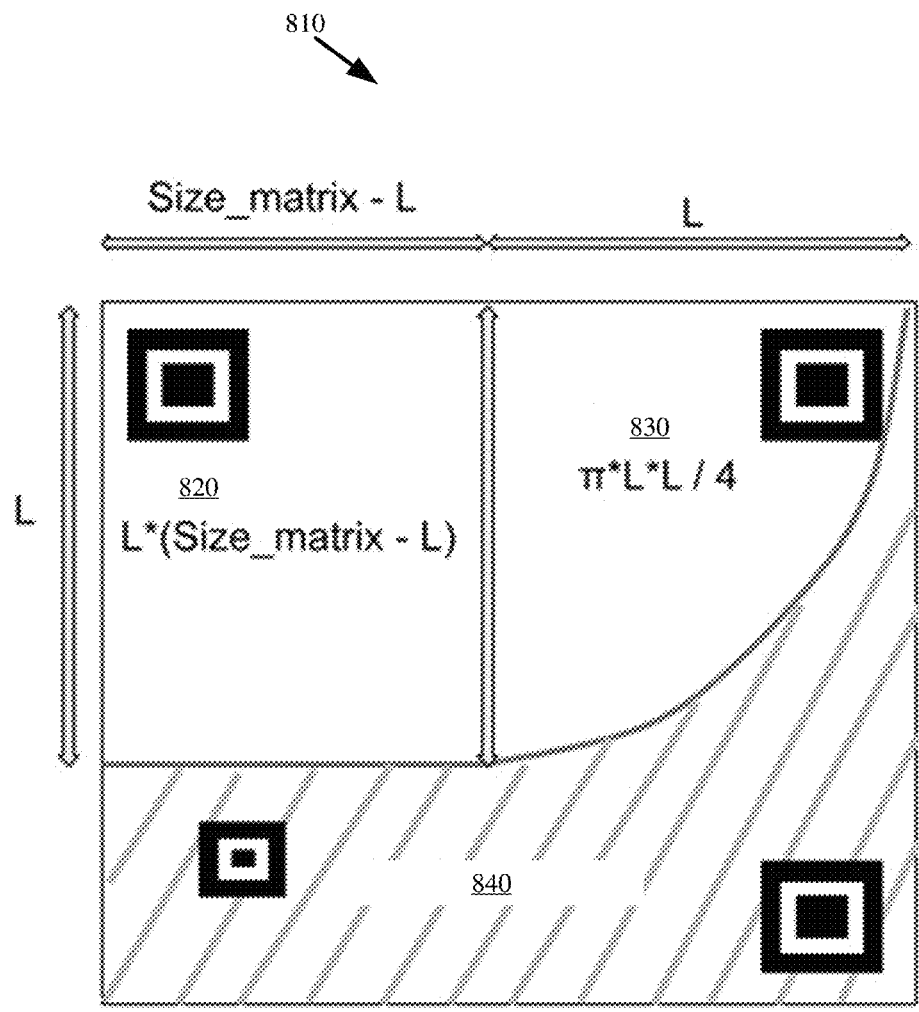
FIG. 8 visually represents the prioritization of different QR code cells by a priority function in accordance with some embodiments presented herein.

FIG. 8 visually represents the prioritization of different QR code cells by a priority function in accordance with some embodiments presented herein. As shown in FIG. 8, the priority function may set the upper and left portions of customized QR code 810, identified by reference markers 820 and 830, to substantially match or align with the pixels of an image that are within those portions. Accordingly, the priority function prioritizes visual property matching at 820 and 830, and therefore adjusts padding zone 730 and error zone 740 of customized QR code 810 at 820 and 830 to match the visual properties of aligned sections of the image that will be integrated with the customized QR code.

FIG. 8 also illustrates the priority function deemphasizing the bottom and right portions of customized QR code 810 that is identified by reference marker 840. Accordingly, area 840 may present data zone 720 with the encoded message and/or error correction code with little or no modification or beautification. In other words, the priority function illustrated in FIG. 8 may produce customized QR code 810 to minimize or eliminate distortion of an image, that is integrated with customized QR code 810, at the upper and left portions of the image, while distorting the image at the bottom and right portions of the image in order to provide a readable/scannable section within customized QR code 810 that conveys the encoded message.

An example priority function (8) for generating a customized QR code with prioritized sections matching those presented in FIG. 8 is provided below:

$$L = \frac{QR_{len} - \sqrt{QR_{len}^2 - 4F\left(1 - \frac{\pi}{4}\right)}}{2 - \frac{x}{2}} \quad (8)$$

$$\text{Priority}(x, y) = \begin{cases} \frac{x^2 + (y - QR_{len} + L)^2}{L^2} & y \in (QR_{len} - L, QR_{len}) \\ \frac{x^2}{L^2} & y \in (0, QR_{len} - L) \end{cases}$$

The variable $QR_{len}$ may represent the number of QR cells on a line/column, and F may represent the number of cells that can be set using the Gauss normalization procedure above.

Other priority functions may be used to prioritize the visual properties at different sections of a generated customized QR code. An alternative priority function (9) is provided below:

$$\text{Priority}(x, y) = \max\left\{0, \frac{1}{2}\left(1 - \left(\frac{x - \frac{QR_{len}}{2}}{\frac{QR_{len}}{2} \times 1.2}\right)^2 - \left(\frac{y - \frac{QR_{len}}{2}}{\frac{QR_{len}}{2} \times 0.9}\right)^2\right)\right\} \quad (9)$$

Figure 9:
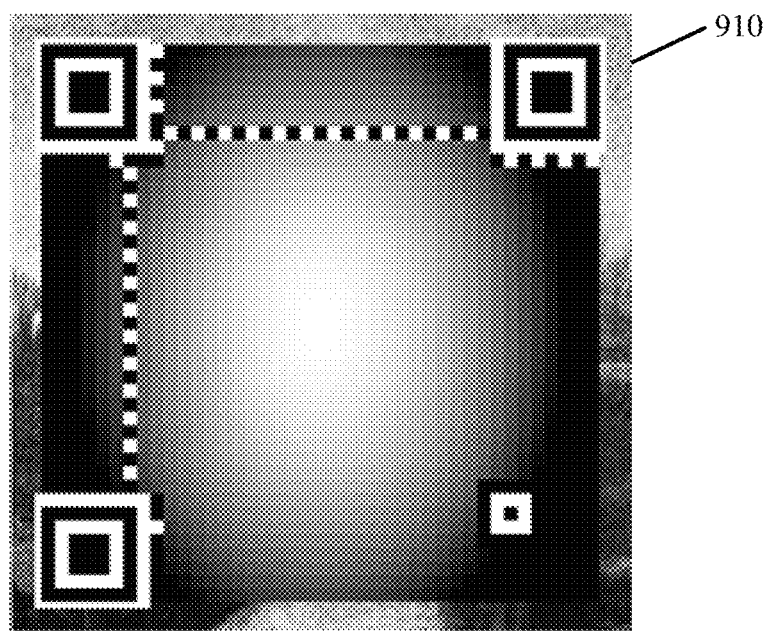
FIG. 9 conceptually illustrates application of a priority function in accordance with some embodiments presented herein.
Figure 9:
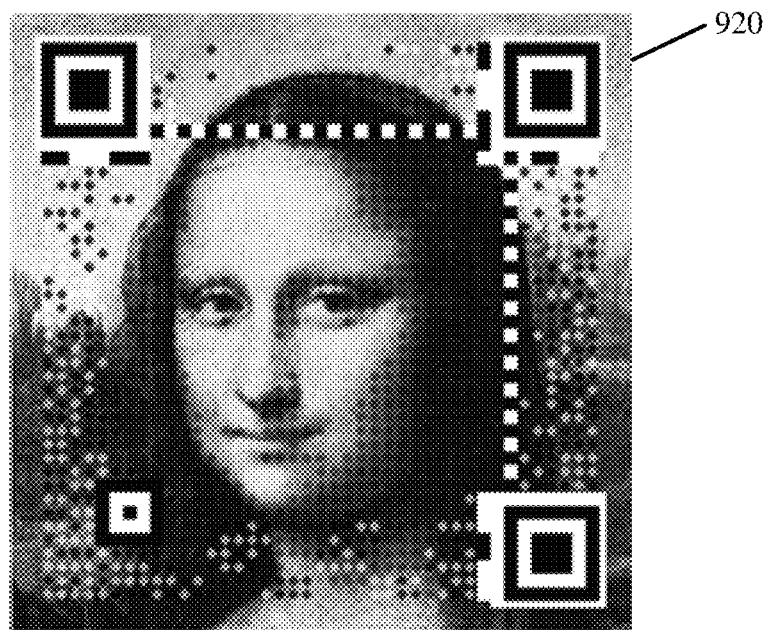

FIG. 9 conceptually illustrates application of priority function (9) in accordance with some embodiments presented herein. As shown in image 910, priority function (9) prioritizes visual property matching at the center of the customized QR code. Accordingly, there is minimal distortion at the center of image 920 that is integrated with the customized QR code, wherein the customized QR code is produced using priority function (9). The priority function places the encoded message and/or error correction code for the customized QR code at the edges or border of image 920.

Dynamically changing the customized QR code to blend with changing images in a video may include performing the Gauss normalization procedure on a previously generated and/or integrated customized QR code as needed (e.g., for each cluster or set of frames) and/or changing the priority function to change areas in the customized QR code that are prioritized relative to the changing images. The Gauss normalization and priority functions are provided as examples of techniques that can be used to dynamically change the appearance of QR codes to blend and/or conform with changing images within a video without changing the message and/or data that is decoded from the QR codes. Other embodiments may implement other techniques, in addition to or instead of the Gauss normalization and priority functions, to change the appearance of the QR codes in the video without changing the encoded message and/or data of the QR codes.

Figure 10:
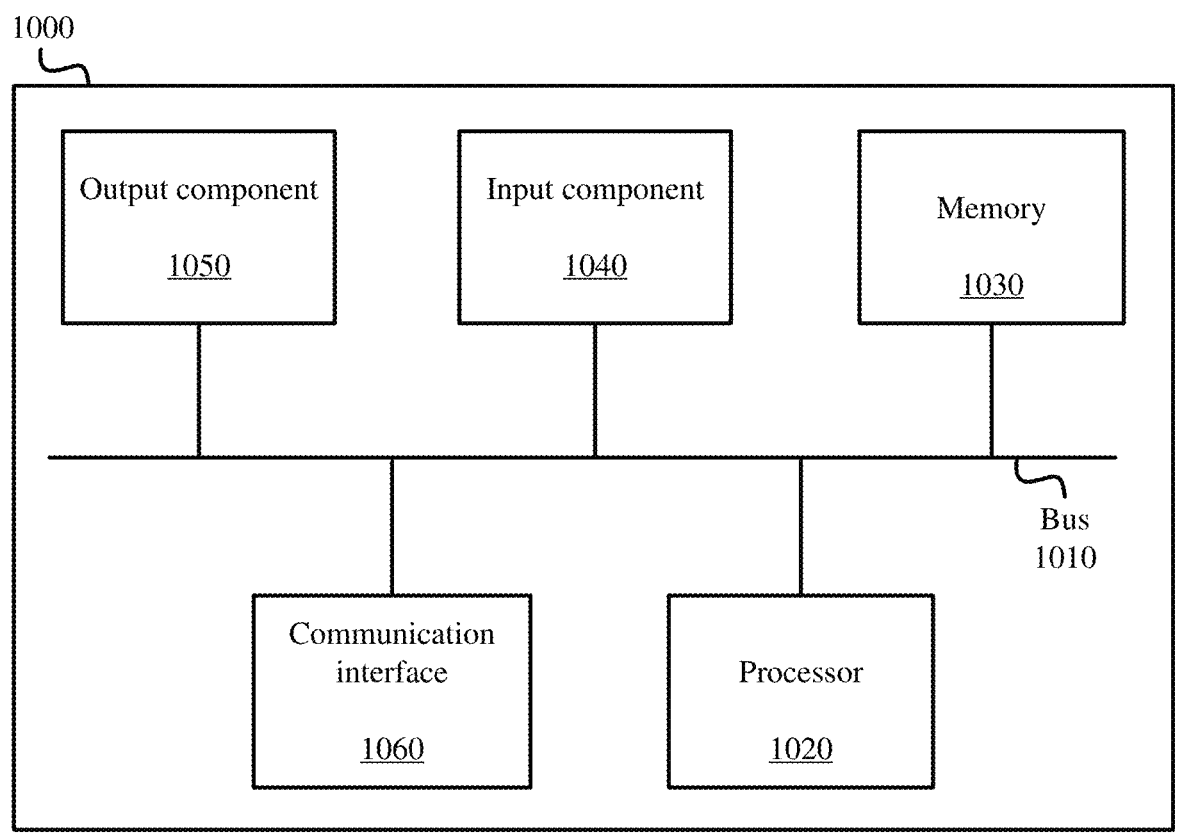
FIG. 10 illustrates example components of one or more devices, according to one or more embodiments described herein.

FIG. 10 is a diagram of example components of device 1000. Device 1000 may be used to implement one or more of the devices or systems described above (e.g., customized QR code generation and integration device 610, playback device 650, reader 660, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

Some implementations described herein may be described in conjunction with thresholds. The terra "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a video comprising a plurality of images;
   clustering a first set of the plurality of images based on an amount of variation in the first set of images;
   determining visual properties for a set of pixels at a first location within the first set of images;
   generating an identifier as a two-dimensional pattern comprising a plurality of different colored blocks that encode a particular message using coloring that is derived from the visual properties for the set of pixels at the first location;
   integrating the identifier into the first set of images at the first location, wherein a first set of the plurality of different colored blocks preserve the visual properties for a first subset of the set of pixels, and a second set of the plurality of different colored blocks provide a distorted presentation of a second subset of the set of pixels that decodes to the particular message;
   determining the first location in a second set of images, that follows the first set of images, has greater variation than a second location in the second set of images; and
   repositioning the identifier from the first location in the first set of images to the second location in the second set of images.

2. The method of claim 1, wherein the identifier comprises two or more positional indicators with black and white coloring at different corners of the identifier.

3. The method of claim 1, wherein the identifier is a Quick Response ("QR") code that blends with the visual properties for the set of pixels.

4. The method of claim 1 further comprising:
   transforming the identifier based on visual properties of the second set of images, wherein transforming the identifier comprises modifying the two-dimensional pattern to encode the particular message via a different arrangement of different colored blocks; and
   integrating the identifier resulting from said transforming into the second set of images, wherein the identifier integrated in the first set of images differs visually from the identifier integrated in the second set of images, and wherein each of the identifier integrated in the first set of images and the identifier integrated in the second set of images encodes the particular message.

5. The method of claim 1, wherein the identifier is a first identifier, the method further comprising:
   generating a second identifier as a two-dimensional pattern that differs from the two-dimensional pattern of the first identifier and that encodes the particular message of the first identifier using coloring that is derived from visual properties for a set of pixels at the second location of the second set of images; and
   wherein repositioning the identifier comprises integrating the second identifier into the second set of images at the second location.

6. The method of claim 1 further comprising:
   transforming one or more of the pattern and coloring of the identifier in response to visual properties of a set of pixels at the second location of the second set of images differing from the visual properties of the set of pixels at the first location of the first set of images, and wherein said transforming comprises encoding the particular message with a different pattern and coloring.

7. The method of claim 1, wherein generating the identifier comprises:
   encoding the particular message in a first set of bits of the identifier; and
   setting visual properties of the identifier in a second set of bits of the identifier that are different than the first set of bits.

8. The method of claim 7, wherein the first set of bits corresponds to a data zone of the identifier, and wherein the second set of bits corresponds to one or more of a padding zone and error zone of the identifier.

9. The method of claim 1, wherein generating the identifier comprises:
   shifting data encoding the particular message to the second set of blocks based on a priority function that prioritizes a region corresponding to the first subset of pixels from the first set of images; and
   changing visual properties at the first set of blocks by replacing one or more bits defining the first set of blocks according to the visual properties for the first subset of pixels.

10. The method of claim 1, wherein integrating the identifier comprises:
    providing the first set of images with the second set of blocks placed over the second subset of pixels of the first set of images.

11. The method of claim 1, wherein generating the identifier comprises:
    performing one or more XOR operations between bits corresponding to the first set of blocks of the identifier and one or more blocks encoding a void string.

12. The method of claim 1, wherein generating the identifier comprises:
replacing error correcting code of the identifier using one or more XOR operations.

13. The method of claim 1 further comprising:
generating a modified video with the identifier integrated at the first location within the first set of images in response to said integrating; and
providing the modified video in response to a request for the video.

14. The method of claim 1 further comprising:
presenting the video with the identifier integrated at the first location within the first set of images; and
presenting the video with a different second identifier integrated at the first location within a second set of images of the video that follow the first set of images, wherein the second identifier encodes the particular message and differs visually from the identifier integrated at the first location within the first set of images.

15. A device comprising:
a non-transitory computer-readable medium storing a set of processor-executable instructions; and
one or more processors configured to execute the set of processor-executable instructions, wherein executing the set of processor-executable instructions causes the one or more processors to:
receive a video comprising a plurality of images;
cluster a first set of the plurality of images based on an amount of variation in the first set of images;
determine visual properties for a set of pixels at a particular location within the first set of images;
generate an identifier as a two-dimensional pattern comprising a plurality of different colored blocks that encode a particular message using coloring that is derived from the visual properties for the set of pixels at the particular location, wherein generating the identifier comprises:
shifting data encoding the particular message to a first set of the plurality of different colored blocks based on a priority function that prioritizes a region corresponding to a first subset of the set of pixels from the first set of images;
changing visual properties at a second set of the plurality of different colored blocks by replacing one or more bits defining the second set of blocks according to the visual properties for the first subset of pixels; and
integrate the identifier into the first set of images at the particular location, wherein the second set of blocks preserve the visual properties for the first subset of the set of pixels, and first set of blocks provide a distorted presentation of a second subset of the set of pixels that decodes to the particular message.

16. The device of claim 15, wherein the one or more processors are further configured to:
transform the identifier based on visual properties from a different second set of images that follow the first set of images in the video, wherein transforming the identifier comprises modifying the two-dimensional pattern to encode the particular message via a different arrangement of different colored blocks; and
integrate the identifier resulting from said transforming into the second set of images, wherein the identifier integrated in the first set of images differs visually from the identifier integrated in the second set of images, and wherein each of the identifier integrated in the first set of images and the identifier integrated in the second set of images encodes the particular message.

17. The device of claim 15, wherein the identifier is a first identifier, and wherein the one or more processors are further configured to:
generate a second identifier as a two-dimensional pattern that differs from the two-dimensional pattern of the first identifier and that encodes the particular message of the first identifier using coloring that is derived from visual properties for a set of pixels from a second set of images of the video that follow the first set of images; and
integrate the second identifier into the second set of images.

18. A method comprising:
receiving a video comprising a plurality of images;
clustering a first set of the plurality of images based on an amount of variation in the first set of images;
determining visual properties for a set of pixels at a particular location within the first set of images;
generating an identifier as a two-dimensional pattern comprising a plurality of different colored blocks that encode a particular message using coloring that is derived from the visual properties for the set of pixels at the particular location, wherein generating the identifier comprises:
shifting data encoding the particular message to a first set of the plurality of different colored blocks based on a priority function that prioritizes a region corresponding to the first subset of pixels from the first set of images; and
changing visual properties at a second set of the plurality of different colored blocks by replacing one or more bits defining the second set of blocks according to the visual properties for the first subset of pixels; and
integrating the identifier into the first set of images at the particular location, wherein the first set of blocks provide a distorted presentation of a second subset of the set of pixels that decodes to the particular message, and the second set of blocks preserve the visual properties for the first subset of pixels.

* * * * *